(12) United States Patent
Zhang et al.

(10) Patent No.: US 8,699,253 B2
(45) Date of Patent: Apr. 15, 2014

(54) CONTROL METHOD FOR SOFT SWITCH CIRCUIT IN SWITCH POWER SOURCE

(75) Inventors: Chuntao Zhang, Shenzhen (CN); Xiaofei Zhang, Shenzhen (CN); Xueli Xiao, Shenzhen (CN)

(73) Assignee: Liebert Corporation, Columbus, OH (US)

( * ) Notice: Subject to any disclaimer, the term of this patent is extended or adjusted under 35 U.S.C. 154(b) by 559 days.

(21) Appl. No.: 12/676,639

(22) PCT Filed: Sep. 5, 2008

(86) PCT No.: PCT/CN2008/072281
§ 371 (c)(1),
(2), (4) Date: Aug. 3, 2011

(87) PCT Pub. No.: WO2009/033414
PCT Pub. Date: Mar. 19, 2009

(65) Prior Publication Data
US 2011/0278953 A1 Nov. 17, 2011

(30) Foreign Application Priority Data
Sep. 5, 2007 (CN) .......................... 2007 1 0147384

(51) Int. Cl.
*H02M 7/5387* (2007.01)
*G05F 1/40* (2006.01)

(52) U.S. Cl.
USPC ......... 363/132; 363/21.02; 323/238; 323/239

(58) Field of Classification Search
USPC ......... 363/17, 21.02, 131–134; 323/235, 238, 323/239
See application file for complete search history.

(56) References Cited

U.S. PATENT DOCUMENTS

| | | | | |
|---|---|---|---|---|
| 5,172,309 | A | * | 12/1992 | DeDoncker et al. .......... 363/132 |
| 5,568,368 | A | * | 10/1996 | Steigerwald et al. ........... 363/17 |
| 5,841,644 | A | * | 11/1998 | Lipo et al. ....................... 363/37 |
| 7,126,833 | B2 | * | 10/2006 | Peng .............................. 363/132 |
| 7,869,226 | B2 | * | 1/2011 | Sirio et al. ....................... 363/17 |
| 2010/0315152 | A1 | * | 12/2010 | Zhang et al. ................... 327/434 |

FOREIGN PATENT DOCUMENTS

CN 2938558 8/2007

* cited by examiner

*Primary Examiner* — Jessica Han
(74) *Attorney, Agent, or Firm* — Harness, Dickey & Pierce, P.L.C.

(57) ABSTRACT

The present invention discloses a control method for a soft switch circuit in a switch power source, which generates an alternating primary power filter current by controlling first and second primary power switching devices to be closed and opened, and generates an intermittent alternating resonant current in the same direction as the primary power filter current in a resonant branch by controlling forward and backward auxiliary switching devices to be closed and opened to thereby achieve closing of the first and second primary power switching devices at a zero voltage, and which generates a balance current with the same magnitude as and in the opposite direction to the resonant current in the resonant branch in at least a period of time during the resting of the resonant current by further controlling the forward and backward auxiliary switching devices to be closed and opened to thereby achieve an average current of zero across the resonant branch in a switching cycle. Without any additional balance circuit, this control method can address the imbalance problem of output power of the positive and negative direct current input voltage sources in a soft switch circuit of an existing switch power source.

8 Claims, 3 Drawing Sheets

CONTROL METHOD FOR SOFT SWITCH CIRCUIT IN SWITCH POWER SOURCE

FIELD OF THE INVENTION

The present invention relates to a switch power source, and in particular to a control method for a soft switch circuit in a switch power source.

BACKGROUND OF THE INVENTION

Switch power sources are currently in the trend of evolving towards miniaturization at a high frequency, a high power density, a high efficiency and a low cost. Since semiconductor devices in traditional switch power sources function as hard switches, the sources suffer from a great loss, fail to improve their own efficiencies and thus become less and less competitive for the market due to their bulkiness. In view of limitations by the development in the industry of semiconductor devices, the cost, etc., a soft switch circuit topology has been an option for the majority of switch power source manufacturers to improve product competitiveness. There are numerous researches and patents on soft switch circuits, and one of them is a Auxiliary Resonant Commutated Pole (ARCP) soft switch circuit in the form of "inductor connected with switch in series", which has won the popular favor of those skilled in the art of switch power sources due to its simply hardware circuit, easiness to control and satisfactory effect. Chinese Utility Model Patent ZL 200620131113.6, for example, discloses an ARCP soft switch circuit, which is an improvement of such a soft switch circuit.

FIG. 1 illustrates a schematic diagram of an operation principle of the soft switch circuit in the form of "inductor connected with switch in series" as follows:

Positive and negative direct current input voltage source±½Ud and primary power switching transistors SW1 and SW2 constitute a primary power half bridge inverter circuit, so that a high frequency pulse voltage of ±½Ud is generated at the point B by closing and opening SW1 and SW2 constantly, and a desired power frequency output voltage Uo is generated across a filter capacitor C3 and a primary power filter current I1 is generated across a filter inductor L1 by a primary power filter circuit. Here, the primary power switching devices SW1 and SW2 belonging to traditional hard switch circuits, which suffer from a great loss.

In order to decrease the loss of the primary power switching devices SW1 and SW2, two unidirectional auxiliary switching devices SW3 and SW4 and a resonant inductor L2 are added in the ARCP soft switch circuit, and the primary power switching devices SW1 and SW2 respectively are arranged in parallel across resonant capacitors C1 and C2 with large capacitances relative to parasitic capacitances of SW1 and SW2. A resonant current I2 is generated on the resonant inductor L2 in the same direction as the primary power filter current I1 by controlling the unidirectional auxiliary switching devices SW3 and SW4 to be closed and opened, and closing of the primary power switching devices SW1 and SW2 at a zero voltage is achieved by the resonance of the resonant inductor L2 and the resonant capacitor C3. Also the parallel arrangement of the resonant capacitors C1 and C2 with much larger capacitances than parasitic capacitances of the primary power switching devices SW1 and SW2 across SW1 and SW2 respectively achieves opening of the primary power switching devices at a zero voltage. Thus, the ARCP soft switch circuit can achieve both closing and opening of the primary power switching devices SW1 and SW2 at a zero voltage to thereby significantly decrease the loss of the primary power switching devices. Regarding the additional unidirectional auxiliary switching devices SW3 and SW4, no the sudden changes of current will occur due to the presence of the resonant inductor L2 in series therewith to thereby achieve closing at a zero current, and opening of the auxiliary switching devices SW3 and SW4 at a zero current can be achieved by controlling the moments of SW3 and SW4 to be closed and opened reasonably and effectively, so that the additional unidirectional auxiliary switching devices SW3 and SW4 can operate in a status of being both closed and opened at a zero current with a very small switching loss. FIG. 2A and FIG. 2B illustrate schematic diagrams of switching logics in positive and negative halves of a cycle respectively of this ARCP soft switch circuit.

As can be apparent from the foregoing analysis, the ARCP soft switch circuit achieve both switching of the primary power switching devices SW1 and SW2 at a zero voltage with a reduced loss and switching of the unidirectional auxiliary switching devices SW3 and SW4 at a zero current with a very small switching loss that substantially can be negligible to thereby archive a significantly improved overall operation efficiency, a greatly decreased overall loss, a markedly reduced volume and hence an enhanced competitiveness of the whole machine production.

Although the ARCP soft switch circuit is rather satisfactory in terms of the reduced loss of the switching devices and the improved efficiency, this circuit suffers from a significant drawback, i.e., imbalance of power output from the positive and negative direct current input voltage sources and consequent imbalance of positive and negative direct current input voltages, which may result in a series of problems, for example:

1) An excessive voltage may cause a device to be inoperative or damaged;
2) An output voltage may be asymmetry in positive and negative halves of a cycle, so indexes, e.g., precision, distortion, etc., of the output voltage will not be satisfactory.
3) A load fails to function normally.

In summary, a resonant current introduced in the ARCP soft switch circuit between the midpoint N of the positive and negative direct current input voltage sources±½Ud and the output point B of the half bridge circuit may cause inconsistency of output power of the positive and negative direct current input voltage sources±½Ud to thereby result in an offset of their voltages and further a series of problems. This may be an inevitable and fatal drawback of the ARCP soft switch circuit topology and consequently limit the application scope and reliability thereof.

In order to address this problem, it is a common practice to add an external balance circuit to balance the input voltages. As illustrated in FIG. 3, a balance current Ib introduced between the balance circuit and the midpoint N of the positive and negative direct current input voltage sources can cancel off the problem by controlling them to be equal to the resonant current I2, Ib=I2, that is, the resonant current I2 and the balance current Ib are both equal in magnitude and identical in direction at any time. For (I+)+(I2)=(I−)+(Ib), (I+)=(I−) can be derived from Ib=I2, and this indicates consistency of output power of the positive and negative direct current input voltage sources, thereby addressing the imbalance problem of the positive and negative direct current input voltage sources.

Although the foregoing method in which an external balance circuit is added can address the imbalance problem of the positive and negative direct current input voltages, it can be apparent that the entire circuit may be complicated and suffer from a raised cost, an increased volume, a lowered efficiency and greatly lowered reliability due to the additional balance circuit. In other words, an additional balance circuit has to be provided for the use of the ARCP soft switch circuit, and this balance circuit will scale up along with increasing power of the primary power circuit. If output power of the primary power circuit is tens to hundreds of kilowatts, the disadvantages of the additional balance circuit, such as volume, cost, efficiency, reliability, etc. will become more prominent and may even cancel off the benefit from the use of the ARCP soft switch circuit.

SUMMARY OF THE INVENTION

A technical issue to be addressed by the invention is how to overcome the foregoing imbalance problem of output power of the positive and negative direct current input voltage sources without any additional balance circuit.

In order to address the foregoing technical issue, the invention proposes a novel control method based upon an ARCP soft switch circuit, wherein under the control of the existing soft switch circuit, a balance current with the same magnitude as and in the opposite direction to the subsequently generated resonant current is generated in the resonant branch in at least a period of time during the resting of the resonant current by further controlling the forward and backward auxiliary switching devices to be closed and opened to thereby achieve an average current of zero in the resonant branch during a switching cycle and thus address the imbalance problem of the positive and negative direct current input voltages.

In a preferred solution of the invention, a particular control method is provided as the following: in the positive half of a cycle, i.e., when the primary power current is in the positive direction, the forward auxiliary switching devices is closed after the first primary power switching device is closed, and opened at the moment when the first primary power switching device is opened to generate the balance current with the same magnitude as and in the opposite direction to the resonant current in the resonant branch to thereby achieve an average current of zero in the resonant branch during the positive half of a cycle; and in the negative half of a cycle, i.e., when the primary power current is in the negative direction, the backward auxiliary switching devices is closed after the second primary power switching device is closed, and opened at the moment when the second primary power switching device is opened to generate the balance current with the same magnitude as and in the opposite direction to the resonant current in the resonant branch to thereby achieve an average current of zero in the resonant branch during the negative half of a cycle.

In another preferred solution of the invention, a particular control method is provided as the following: in the positive half of a cycle, i.e., when the primary power current is in the positive direction, the forward auxiliary switching devices is closed after the first primary power switching device is closed, and opened in a period of first dead area to generate the balance current with the same magnitude as and in the opposite direction to the resonant current in the resonant branch to thereby achieve an average current of zero in the resonant branch during the positive half of a cycle; and in the negative half of a cycle, i.e., when the primary power current is in the negative direction, the backward auxiliary switching devices is closed after the second primary power switching device is closed, and opened in a period of second dead area to generate the balance current with the same magnitude as and in the opposite direction to the resonant current in the resonant branch to thereby achieve an average current of zero in the resonant branch during the negative half of a cycle.

In still another preferred solution of the invention, a particular control method is provided as the following: in the positive half of a cycle, i.e., when the primary power current is in the positive direction, the forward auxiliary switching devices is closed after the first primary power switching device is closed, and opened prior to the moment when the first primary power switching device is opened to generate the balance current with the same magnitude as and in the opposite direction to the resonant current in the resonant branch to thereby achieve an average current of zero in the resonant branch during the positive half of a cycle; and in the negative half of a cycle, i.e., when the primary power current is in the negative direction, the backward auxiliary switching devices is closed after the second primary power switching device is closed, and opened prior to the moment when the second primary power switching device is opened to generate the balance current with the same magnitude as and in the opposite direction to the resonant current in the resonant branch to thereby achieve an average current of zero in the resonant branch during the negative half of a cycle.

At least one of the primary switching devices and the auxiliary switching devices may be an IGBT, MOSFET, GTO or SCR.

Advantageous effects of the invention over the prior art are as the following:

The invention can remedy the drawback inherent in the ARCP soft switch circuit without any additional external circuit and can both offer the original function for implementing a soft switch and overcome the imbalance problem of output power of the positive and negative direct current input voltage sources to thereby avoid a series of problems due to imbalance of the positive and negative direct current input voltages. Moreover, no additional balance circuit will be required to thereby greatly simplify the circuit, reduce the overall volume thereof, improve the efficiency thereof and hence achieve a significant technical effect.

DETAILED DESCRIPTION OF THE INVENTION

The control method according to the invention will be further detailed hereinafter with reference to the drawings and in connection with the embodiments thereof.

Figure 1:
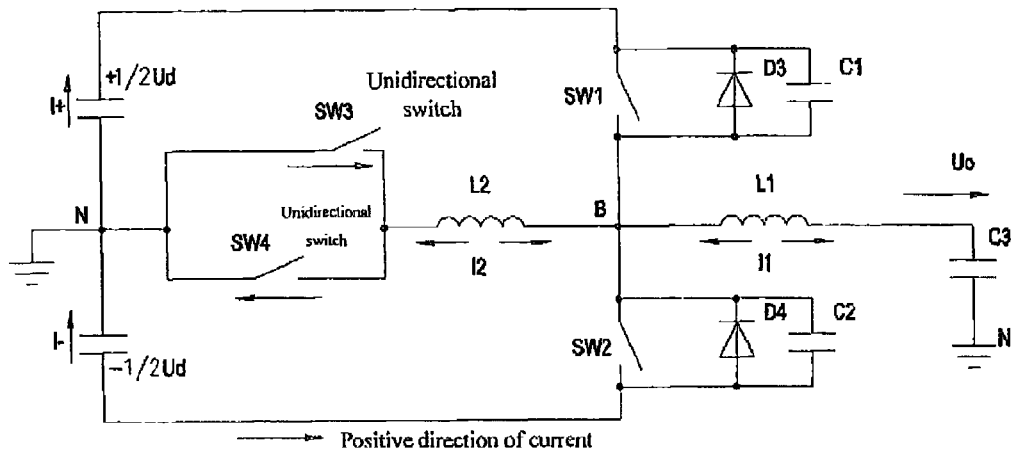
FIG. 1 illustrates a schematic diagram of an operation principle of an ARCP soft switch circuit in the prior art.
Figure 2A:
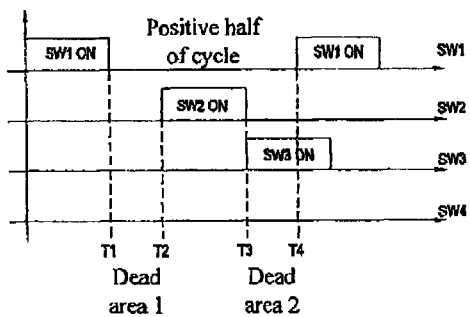
FIG. 2A and FIG. 2B illustrate schematic diagrams of switch logics in positive and negative halves of a cycle of the ARCP soft switch circuit in the prior art.
Figure 2B:
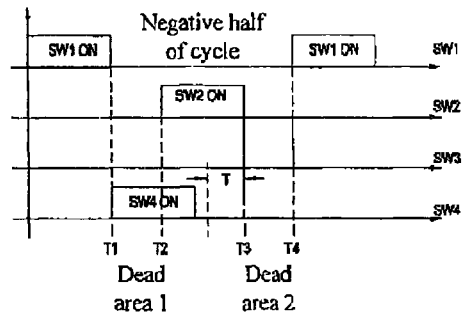
Figure 3:
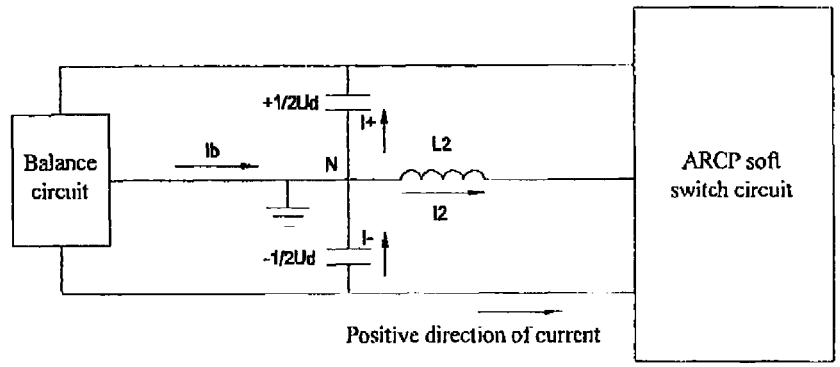
FIG. 3 illustrates a schematic diagram of an operation principle of a method in which an external balance circuit is added.

An analysis of the drawback inherent in the ARCP soft switch circuit in the prior art shall be made to address the same. As can be apparent from FIG. 1 illustrating a schematic diagram of the operation principle, essentially a resonant branch is added in this circuit between the output point B of the half bridge circuit and the midpoint N of the positive and negative direct current input voltage sources, and the resonant current is generated in this branch to achieve soft switching of the primary power switching devices SW1 and SW2. In order to achieve soft switching, the resonant current I2 shall be consistent in direction with the primary power current I1, and when the resonant current I2 is in the positive direction, it is equivalent for the direct current input power sources of $\pm\frac{1}{2}$Ud that there is a current flowing from N to B, and there is the relationship (I+)+(I2)=(I−), i.e., (I+)<(I−), and it means that a discharging current (I−) of $-\frac{1}{2}$Ud is larger than a discharging current (I+) of $+\frac{1}{2}$Ud, that is, output power of the negative power source is larger than that of the positive power source, which may cause a voltage of the negative power source of $-\frac{1}{2}$Ud to be higher than that of the positive power source of $+\frac{1}{2}$Ud, i.e., imbalance of positive and negative direction current input voltages.

Similarly, if the resonant current I2 is in the negative direction, then the relationship (I−)+(I2)=(I+) holds, i.e., (I+)>(I−), and it means that a discharging current (I+) of $+\frac{1}{2}$Ud (I+) is larger than a discharging current (I−) of $-\frac{1}{2}$Ud (I−), that is, output power of the positive power source is larger than that of the negative power source, which may cause a voltage of the positive power source of $+\frac{1}{2}$Ud to be higher than that of the negative power source of $-\frac{1}{2}$Ud, i.e., imbalance of positive and negative direction current input voltages.

In view of the foregoing analysis, the invention proposes the following embodiments.

The First Embodiment

Figure 4:
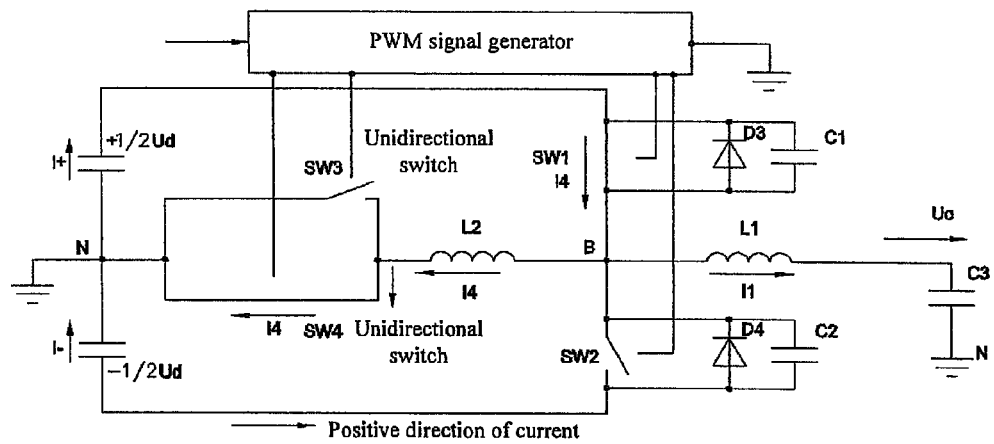
FIG. 4 illustrates a schematic diagram of an operation status at a moment SW4 is closed in the positive half of a cycle according to a first embodiment of the invention.
Figure 5:
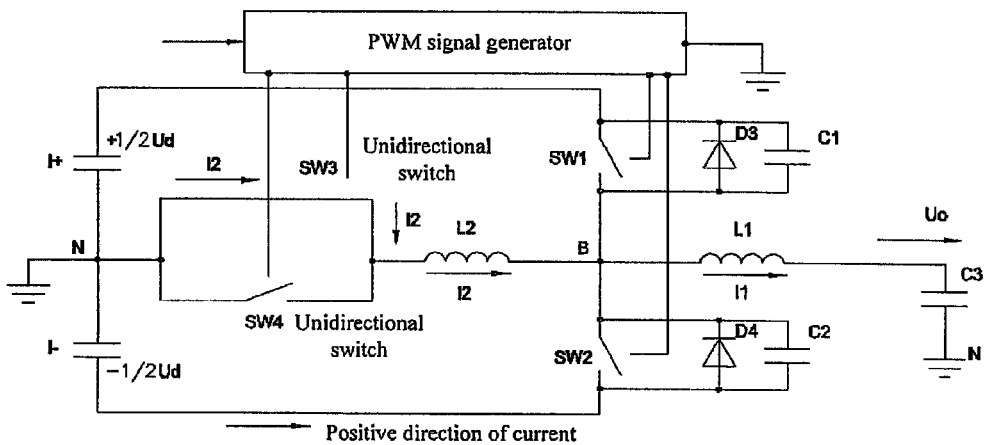
FIG. 5 illustrates a schematic diagram of an operation status at a moment SW3 is closed in the positive half of a cycle according to the first embodiment of the invention.
Figure 6:
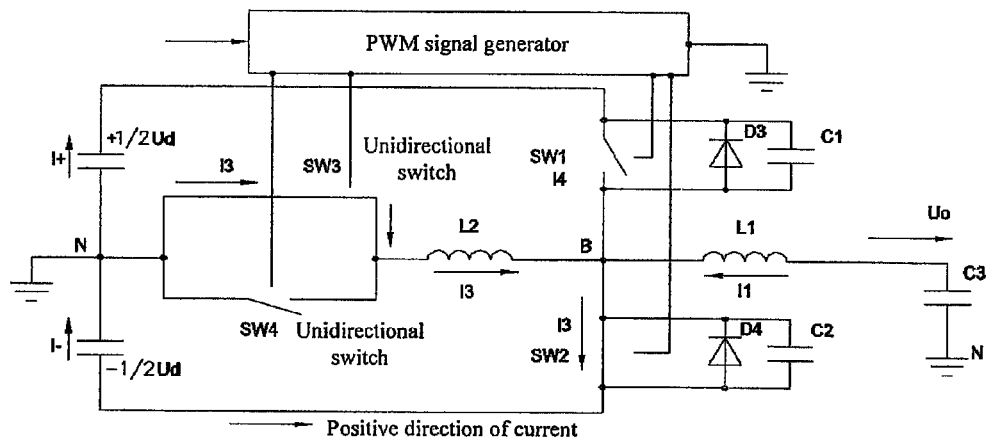
FIG. 6 illustrates a schematic diagram of an operation status at a moment SW3 is closed in the negative half of a cycle according to the first embodiment of the invention.
Figure 7:
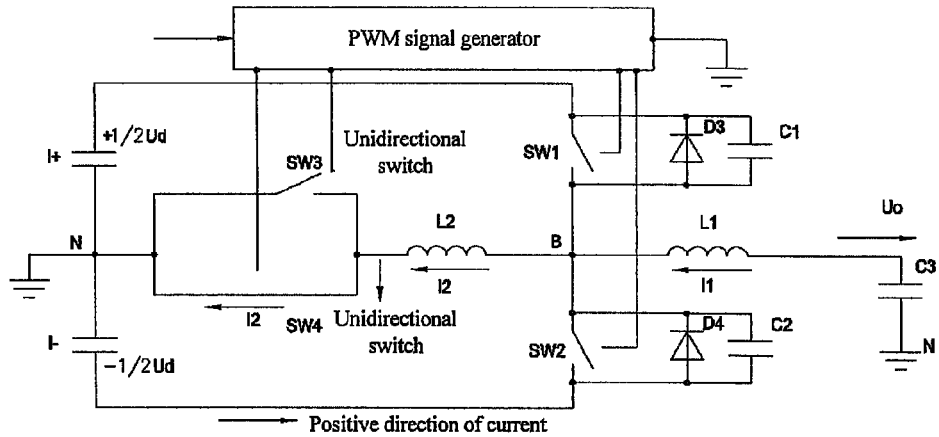
FIG. 7 illustrates a schematic diagram of an operation status at a moment SW4 is closed in the negative half of a cycle according to the first embodiment of the invention.

FIG. 4 illustrates a schematic diagram of a circuit operation status corresponding to a moment when the forward auxiliary switching device SW4 is closed in the positive half of a cycle of a soft switch circuit according to the embodiment of the invention, FIG. 5 illustrates a schematic diagram of a circuit operation status corresponding to a moment when the backward auxiliary switching device SW3 is closed in the positive half of a cycle of the soft switch circuit according to the embodiment of the invention, FIG. 6 illustrates a schematic diagram of a circuit operation status corresponding to a moment the backward auxiliary switching device SW3 is closed in the negative half of a cycle of the soft switch circuit according to the embodiment of the invention, and FIG. 7 illustrates a schematic diagram of a circuit operation status corresponding to a moment the forward auxiliary switching device SW4 is closed in the negative half of a cycle of the soft switch circuit according to the embodiment of the invention. The circuit includes a primary power half bridge inverter circuit composed of positive and negative direct current input voltage sources and the primary power switching devices SW1 and SW2, a primary power filter circuit which generates a power frequency output voltage Uo and a primary power filter circuit I1 and further includes the unidirectional auxiliary switching devices SW3 and SW4 and the auxiliary inductor L2 for reducing a loss of the primary power switching devices SW1 and SW2, and a PWM signal generator for controlling the primary power switching devices SW1 and SW2 and the auxiliary switching devices SW3 and SW4 to be closed and opened.

The PWM signal generator for controlling the primary power switching devices SW1 and SW2 and the forward and backward auxiliary switching devices SW4 and SW3 to be closed and opened can alternatively be a PFM signal generator, a PWM-PFM hybrid signal generator, another square wave signal generator or CPU, etc.

Figure 8A:
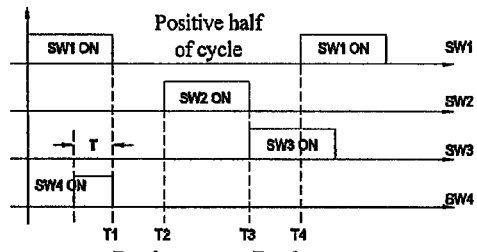
FIG. 8A and FIG. 8B illustrate schematic diagrams of switch logics in the positive and negative halves of a cycle according to the first embodiment of the invention.

According to the embodiment of the invention, as illustrated in FIG. 8A, in the positive half of a cycle i.e., when the primary power current I1 is in the positive direction, the PWM signal generator further controls, under the foregoing control of the ARCP soft switch circuit, the forward auxiliary switch device SW4 to be closed after the first primary power switching device SW1 is closed and to be opened at the moment T1 when the first primary power switching device SW1 is opened to thereby generate a backward balance current I4 with the same magnitude as and in the opposite direction to the resonant current I2 which will be subsequently generated after the backward auxiliary switching device SW3 is closed, where the relationship I2=−I4 holds, that is, the relationship I2+I4=0 holds, and it means that a current in the balance line averaged over a switching cycle is at zero. Due to the high switching frequency typically ranging from several kilohertz to tens of kilohertz and the short switching cycle typically ranging from several microseconds to tens of microseconds, it can be considered that neither positive nor negative input voltage will change in a period of time of the microsecond order. The sum of the backward balance current I4 and the resonant current I2 in the resonant line during a switching cycle is zero, and it means that the current average in the resonant branch between N and B is zero, that is, there is no current in the resonant branch, so the relationship (I+)=(I−) holds, thereby addressing the imbalance problem of output power of the positive and negative direct current input voltage sources.

Figure 8B:
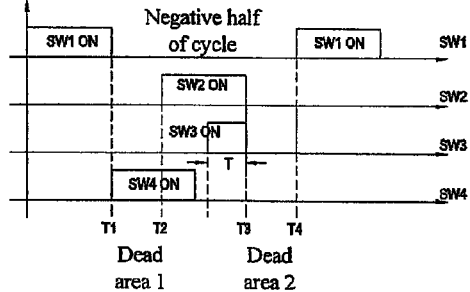

According to the embodiment of the invention, as illustrated in FIG. 8B, in the negative half of a cycle i.e., when the primary power current I1 is in the negative direction, the PWM signal generator further controls, under the foregoing control of the ARCP soft switch circuit, the backward auxiliary switching device SW3 to be closed after the second primary power switching device SW2 is closed and to be opened at the moment T1 when the second primary power switching device SW2 is opened to thereby generate a forward balance current I3 with the same magnitude as and in the opposite direction to the resonant current I2 which will be subsequently generated after the first primary power switching device (SW1) is closed, that is, the relationship I2+I3=0 holds. In analogy to the positive half of a cycle, the relationship (I+)=(I−) holds, thereby addressing the imbalance problem of output power of the positive and negative direct current input voltage sources.

The invention can further address the imbalance problem of output power of the positive and negative direct current input voltage sources in the following embodiments.

The Second Embodiment

Figure 9A:
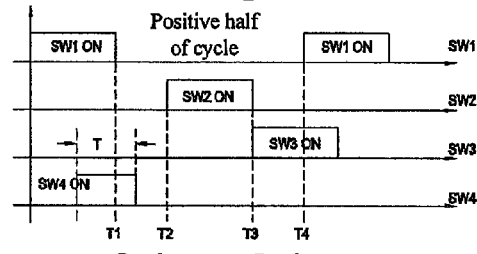
FIG. 9A and FIG. 9B illustrate schematic diagrams of switch logics in positive and negative halves of a cycle according to a second embodiment of the invention.
Figure 9B:
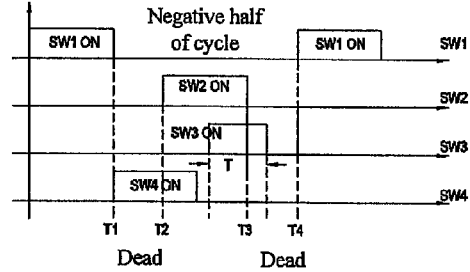

A timing control for the switching devices is performed as in the schematic diagrams of switch logics illustrated in FIG. 9A and FIG. 9B. That is, under the control logic of the ARCP soft switch circuit, SW4 is closed after SW1 is closed, and opened during a period of first dead area [T1~T2] in the positive half of a cycle to thereby generate the balance current I4 with the same magnitude as and in the opposite direction to the subsequently generated resonant current I2; and SW3 is closed after SW2 is closed, and opened during a period of second dead area [T3~T4] in the negative half of a cycle to thereby generate the balance current I3 with the same magnitude as and in the opposite direction to the subsequently generated resonant current I2.

The Third Embodiment

Figure 10A:
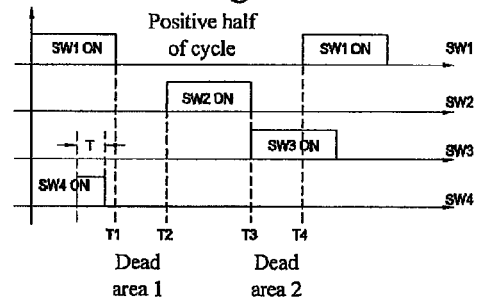
FIG. 10A and FIG. 10B illustrate schematic diagrams of switch logics in positive and negative halves of a cycle according to a third embodiment of the invention.
Figure 10B:
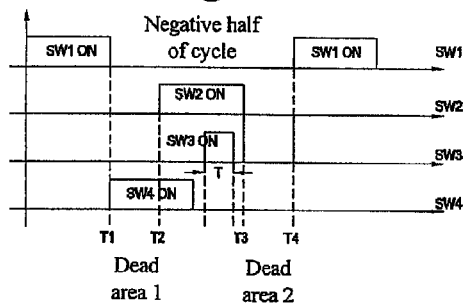

A timing control for the switching devices is performed as in the schematic diagrams of switching logics illustrated in FIG. 10A and FIG. 10B. That is, under the control logic of the ARCD soft switch circuit, SW4 is closed after SW1 is closed, and opened prior to the moment T1 when SW1 is opened in the positive half of a cycle to thereby generate the balance current I4 with the same magnitude as and in the opposite direction to the subsequently generated resonant current I2; and SW3 is closed after SW2 is closed, and opened prior to the moment T3 when SW2 is opened in the negative half of a cycle to thereby generate the balance current I3 with the same magnitude as and in the opposite direction to the subsequently generated resonant current I2.

In the context of the invention, the two unidirectional auxiliary switching devices are defined as forward and backward auxiliary switching devices respectively to distinguish between their uni-directivity of conducting a current in the circuit but not to represent any actual current direction.

The foregoing disclosure presents further detailed descriptions of the invention in connection with the preferred embodiments thereof but shall not be intended to limit the scope of the invention thereto. Various modifications and variations that can be made by those ordinarily skilled in the art without departing from the scope of the invention shall be regarded as falling within the scope of the invention.

The invention claimed is:

1. A control method for a soft switch circuit in a switch power source comprising:
   generating an alternating primary power filter current by controlling first and second primary power switching devices to be closed and opened;
   generating an intermittent alternating resonant current in the same direction as the primary power filter current in a resonant branch by controlling forward and backward auxiliary switching devices to be closed and opened to thereby achieve closing of the first and second primary power switching devices at a zero voltage; and
   generating a balance current with the same magnitude as and in the opposite direction to the resonant current in the resonant branch in at least a period of time during the resting of the resonant current by further controlling the forward and backward auxiliary switching devices to be closed and opened, to thereby achieve an average current of zero in the resonant branch during a switching cycle.

2. The control method for a soft switch circuit in a switch power source according to claim 1, wherein said generating the balance current with the same magnitude as and in the opposite direction to the resonant current in the resonant branch comprises:
   in the positive half of a cycle, i.e., when the primary power current is in the positive direction, controlling the forward auxiliary switching devices to be closed after the first primary power switching device is closed and to be opened at the moment when the first primary power switching device is opened, to generate the balance current with the same magnitude as and in the opposite direction to the resonant current in the resonant branch to thereby achieve an average current of zero in the resonant branch during the positive half of a cycle; and
   in the negative half of a cycle, i.e., when the primary power current is in the negative direction, controlling the backward auxiliary switching devices to be closed after the second primary power switching device is closed and to be opened at the moment when the second primary power switching device is opened to generate the balance current with the same magnitude as and in the opposite direction to the resonant current in the resonant branch to thereby achieve an average current of zero in the resonant branch during the negative half of a cycle.

3. The control method for a soft switch circuit in a switch power source according to claim 2, wherein at least one of the primary switching devices and the auxiliary switching devices is an IGBT, MOSFET, GTO or SCR.

4. The control method for a soft switch circuit in a switch power source according to claim 1, wherein said generating the balance current with the same magnitude as and in the opposite direction to the resonant current in the resonant branch comprises:
   in the positive half of a cycle, i.e., when the primary power current is in the positive direction, controlling the forward auxiliary switching devices to be closed after the first primary power switching device is closed and to be opened in a period of first dead area to generate the balance current with the same magnitude as and in the opposite direction to the resonant current in the resonant branch to thereby achieve an average current of zero in the resonant branch during the positive half of a cycle; and
   in the negative half of a cycle, i.e., when the primary power current is in the negative direction, controlling the backward auxiliary switching devices to be closed after the second primary power switching device is closed and to be opened in a period of second dead area to generate the balance current with the same magnitude as and in the opposite direction to the resonant current in the resonant branch, to thereby achieve an average current of zero in the resonant branch during the negative half of a cycle.

5. The control method for a soft switch circuit in a switch power source according to claim 4, wherein at least one of the primary switching devices and the auxiliary switching devices is an IGBT, MOSFET, GTO or SCR.

6. The control method for a soft switch circuit in a switch power source according to claim 1, wherein said generating the balance current with the same magnitude as and in the opposite direction to the resonant current in the resonant branch comprises:
   in the positive half of a cycle, i.e., when the primary power current is in the positive direction, controlling the forward auxiliary switching devices to be closed after the first primary power switching device is closed and to be opened prior to the moment when the first primary power switching device is opened to generate the balance current with the same magnitude as and in the opposite direction to the resonant current in the resonant branch to thereby achieve an average current of zero in the resonant branch during the positive half of a cycle; and
   in the negative half of a cycle, i.e., when the primary power current is in the negative direction, controlling the backward auxiliary switching devices to be closed after the second primary power switching device is closed and to be opened prior to the moment when the second primary power switching device is opened to generate the balance current with the same magnitude as and in the opposite direction to the resonant current in the resonant branch, to thereby achieve an average current of zero in the resonant branch during the negative half of a cycle.

7. The control method for a soft switch circuit in a switch power source according to claim 6, wherein at least one of the primary switching devices and the auxiliary switching devices is an IGBT, MOSFET, GTO or SCR.

8. The control method for a soft switch circuit in a switch power source according to claim 1, wherein at least one of the primary switching devices and the auxiliary switching devices is an IGBT, MOSFET, GTO or SCR.

* * * * *